US012585425B2

(12) United States Patent
Berger et al.

(10) Patent No.: US 12,585,425 B2
(45) Date of Patent: Mar. 24, 2026

(54) LIGHT-FUNCTION AUDIO PARAMETERS

(71) Applicant: SAGEMCOM BROADBAND SAS, Rueil Malmaison (FR)

(72) Inventors: Jérôme Berger, Rueil Malmaison (FR); Vincent Schott, Rueil Malmaison (FR)

(73) Assignee: SAGEMCOM BROADBAND SAS, Rueil Malmaison (FR)

( * ) Notice: Subject to any disclaimer, the term of this patent is extended or adjusted under 35 U.S.C. 154(b) by 190 days.

(21) Appl. No.: 18/340,728

(22) Filed: Jun. 23, 2023

(65) Prior Publication Data

US 2023/0418552 A1     Dec. 28, 2023

(30) Foreign Application Priority Data

Jun. 23, 2022     (FR) ...................................... 2206276

(51) Int. Cl.
| | |
|---|---|
| *G06F 3/16* | (2006.01) |
| *G06T 7/90* | (2017.01) |
| *H05B 47/11* | (2020.01) |

(52) U.S. Cl.
CPC ................ *G06F 3/165* (2013.01); *G06T 7/90* (2017.01); *H05B 47/11* (2020.01)

(58) Field of Classification Search
CPC ............ G06F 3/165; G06T 7/90; H05B 47/11
See application file for complete search history.

(56) References Cited

U.S. PATENT DOCUMENTS

| | | | | |
|---|---|---|---|---|
| 5,666,028 | A | * | 9/1997 | Bechtel ................ B60Q 1/1423 |
| | | | | 315/159 |
| 2016/0057555 | A1 | | 2/2016 | Schuster et al. |
| 2016/0149547 | A1 | | 5/2016 | Rider et al. |
| 2016/0162255 | A1 | | 6/2016 | Nishimura |
| 2020/0380979 | A1 | | 12/2020 | Meacham et al. |
| 2021/0160617 | A1* | | 5/2021 | Neerbek .................. H04R 3/12 |
| 2024/0221710 | A1* | | 7/2024 | Savonet ................... G10H 1/06 |

FOREIGN PATENT DOCUMENTS

CN               107979349 A  *  5/2018  ........... G06T 7/0002

* cited by examiner

*Primary Examiner* — Joseph Saunders, Jr.
(74) *Attorney, Agent, or Firm* — MUNCY, GEISSLER, OLDS & LOWE, P.C.

(57) ABSTRACT

Audio playback equipment includes a loudspeaker, a photosensitive sensor and a processing unit arranged to: acquire or estimate, by using at least one measurement produced by the photosensitive sensor, at least one light parameter representative of a light illuminating an environment of the audio playback equipment; select, according to the light parameter, current values of audio parameters; apply the current values of audio parameters on a primary audio signal (Sap) to produce a secondary audio signal (Sas); playback the secondary audio signal via the internal loudspeaker.

18 Claims, 3 Drawing Sheets

LIGHT-FUNCTION AUDIO PARAMETERS

The invention relates to the field of audio playback electrical equipment.

BACKGROUND OF THE INVENTION

Numerous recent electrical equipment, of the "multimedia" or "mainstream" type, integrate one or more loudspeakers and are therefore capable of playing back audio signals (music, for example).

Among these pieces of audio playback equipment, there are naturally speakers, and in particular, smart speakers. Also there are improved set-top boxes (or STB). Furthermore, there are computers, smartphones, games consoles, etc.

To improve the auditive experience of the user, it is often possible to adjust audio parameters which are applied on the audio signal, just before its playback through the loudspeaker(s). The audio parameters make it possible, for example, to adjust an equalisation curve which specifies a gain to be applied according to the frequency, in order to emphasise or dampen bass, midrange or treble. The audio parameters can also make it possible to adjust filters, such as, for example, a reverberation filter or a background noise damper filter.

The audio parameters are generally adjustable by the user, either by acting directly on the audio playback equipment (via a button, a dimmer, etc.), or by interacting with a configuration menu proposed by the audio playback equipment itself, or via another piece of equipment connected to said audio playback equipment. The sound playback of certain speakers can thus be configured via a dedicated app downloaded onto a smartphone.

The user must therefore itself "manually" modify the different audio parameters, which can prove to be difficult, in particular if the user is not used to handling such equipment. In addition, the user does not necessarily choose the more suitable audio parameters, and therefore it is very frequent that a user never fully utilises the sound playback capacities of their equipment.

AIM OF THE INVENTION

The invention aims to improve the auditive experience of the user of a piece of audio playback equipment.

SUMMARY OF THE INVENTION

In view of achieving this aim, a piece of audio playback equipment is proposed, comprising:
  at least one internal loudspeaker and/or means for connecting with at least one external loudspeaker;
  at least one internal photosensitive sensor and/or means for connecting with at least one external photosensitive sensor;
  a processing unit arranged to:
    acquire or estimate, by using at least one measurement produced by the internal photosensitive sensor and/or the external photosensitive sensor, at least one light parameter representative of a light illuminating an environment of the audio playback equipment;
    select, according to the light parameter, current values of audio parameters;
    apply the current values of the audio parameters on a primary audio signal to produce a secondary audio signal;

playback the secondary audio signal via the internal loudspeaker and/or the external loudspeaker.

The processing unit therefore select, according to the light illuminating the environment of the equipment, current values of the audio parameters which are applied on the audio signal played back by the equipment. The selection is fully automatic and does not require any handling from the user. The user thus benefits from an optimised sound playback according to the lighting and therefore, in particular, according to the time of the day.

In addition, a piece of audio playback equipment is proposed, such as described above, wherein the current values of the audio parameters are selected from among first values of the audio parameters and second values of the audio parameters, the processing unit being arranged to compare the light parameter with at least one predetermined threshold, and to select the first values of the audio parameters or the second values of the audio parameters according to said comparison.

In addition, a piece of audio playback equipment is proposed such as described above, the processing unit being arranged to
  compare the light parameter with a predetermined low threshold and with a predetermined high threshold;
  if said light parameter is less than the predetermined low threshold, select and apply on the primary audio signal, the first values of the audio parameters;
  if said light parameter is greater than the predetermined high threshold, select and apply on the primary audio signal, the second values of the audio parameters.

In addition, a piece of audio playback equipment is proposed, such as described above, wherein the processing unit is arranged to, if said light parameter is between the predetermined low threshold and the predetermined high threshold, continue to apply on the primary audio signal, the current values of the audio parameters previously selected.

In addition, a piece of audio playback equipment is proposed, such as described above, wherein the processing unit is arranged to, if said light parameter is between the predetermined low threshold and the predetermined high threshold, produce the secondary audio signal by using a weighting coefficient, the first values of the audio parameters and the second values of the audio parameters, the weighting coefficient being calculated from the predetermined low threshold, of the predetermined high threshold and of said light parameter.

In addition, a piece of audio playback equipment is proposed, such as described above, wherein the at least one light parameter comprises a luminosity.

In addition, a piece of audio playback equipment is proposed, such as described above, wherein the at least one light parameter comprises a colour temperature.

In addition, a piece of audio playback equipment is proposed, such as described above, the processing unit being arranged to acquire or estimate a first light parameter and a second light parameter, the current values of the audio parameters being selected from among first values of the audio parameters and second values of the audio parameters, the processing unit being further arranged to:
  compare the first light parameter with a first predetermined threshold, and the second light parameter with a second predetermined threshold;
  if the first light parameter and the second light parameter are respectively less than the first predetermined threshold and than the second determined threshold, select and apply on the primary audio signal, the first values of the audio parameters;

if the first light parameter and the second light parameter are respectively greater than the first predetermined threshold and than the second predetermined threshold, select and apply on the primary audio signal, the second values of the audio parameters.

In addition, a piece of audio playback equipment is proposed, such as described above, the audio playback equipment comprising or being connected to a camera, an automatic exposure module being integrated in or connected to said camera, the at least one light parameter comprising a luminosity, the processing unit being arranged to estimate the luminosity from exposure parameters selected by the automatic exposure module.

In addition, a piece of audio playback equipment is proposed, such as described above, the audio playback equipment comprising or being connected to a camera, the at least one light parameter comprising a colour temperature, the processing unit being arranged to:

acquire an image produced by the camera;
estimate the colour temperature from said image.

In addition, a piece of audio playback equipment is proposed, such as described above, comprising the step of calculating an average pixel colour of the image, and of estimating the colour temperature from the average colour.

In addition, a piece of audio playback equipment is proposed, such as described above, the processing unit being arranged to, when new current values of the audio parameters have been selected to replace previous current values of the audio parameters:

initialise a combination coefficient at the start of a transition period of predetermined duration, and progressively vary the combination coefficient during the transition period;

during the transition period, produce the secondary audio signal by using the combination coefficient, the previous current values of the audio parameters and the new current values of the audio parameters;

following the transition period, produce the secondary audio signal by using the new current values of the audio parameters.

In addition, a piece of audio playback equipment is proposed, such as described above, the processing unit being arranged to, when new current values of the audio parameters have been selected to replace previous current values of the audio parameters, expect the occurrence of a period of silence in the primary audio signal, and make the replacement during said period of silence.

In addition, a piece of audio playback equipment is proposed, such as described above, the processing unit being arranged to, when new current values of the audio parameters have been selected to replace previous current values of the audio parameters, expect a reception of a change order coming from a user and having the aim of applying a change on the primary audio signal, then make the replacement at the same time as the change is made.

In addition, a piece of audio playback equipment is proposed, such as described above, the processing unit being arranged to receive metadata identifying a programme being broadcast, including the primary audio signal, and when new current values of the audio parameters have been selected to replace previous current values of the audio parameters, expect that the metadata indicate a change of the programme being broadcast, then make the replacement at the same time as the change is made.

In addition, a piece of audio playback equipment is proposed, such as described above, wherein the audio parameters comprise:

equalisation parameters, comprising gains or lists of gains for different frequency bands, and/or activation parameters of one or more filters, and/or filtering parameters defining, for each filter, a response from said filter.

In addition, a piece of audio playback equipment is proposed, such as described above, wherein the filter(s) comprise(s) a physiological corrective filter and/or a compressor filter and/or a voice intelligibility improvement filter and/or a reverberation filter and/or a background noise damper filter.

In addition, a piece of audio playback equipment is proposed, such as described above, the audio playback equipment being a set-top box.

In addition, an audio playback method is proposed, implemented in the processing unit of a piece of audio playback equipment such as described above, and comprising the steps of:

acquire or estimate, by using at least one measurement produced by the internal photosensitive sensor and/or the external photosensitive sensor, at least one light parameter representative of a light illuminating an environment of the audio playback equipment;

select, according to the light parameter, current values of audio parameters;

apply the current values of the audio parameters on a primary audio signal to produce a secondary audio signal;

playback the secondary audio signal via the internal loudspeaker and/or the external loudspeaker.

In addition, a computer program is proposed, comprising instructions which lead the processing unit of the audio playback equipment such as described above, to execute the steps of the audio playback method such as described above.

In addition, a recording medium which can be read by a computer is proposed, on which the computer program such as described above is recorded.

The invention will be best understood in the light of the description below of particular, non-limiting embodiments of the invention.

BRIEF DESCRIPTION OF THE DRAWINGS

Reference will be made to the accompanying drawings, wherein.

DETAILED DESCRIPTION OF THE INVENTION

Figure 1:
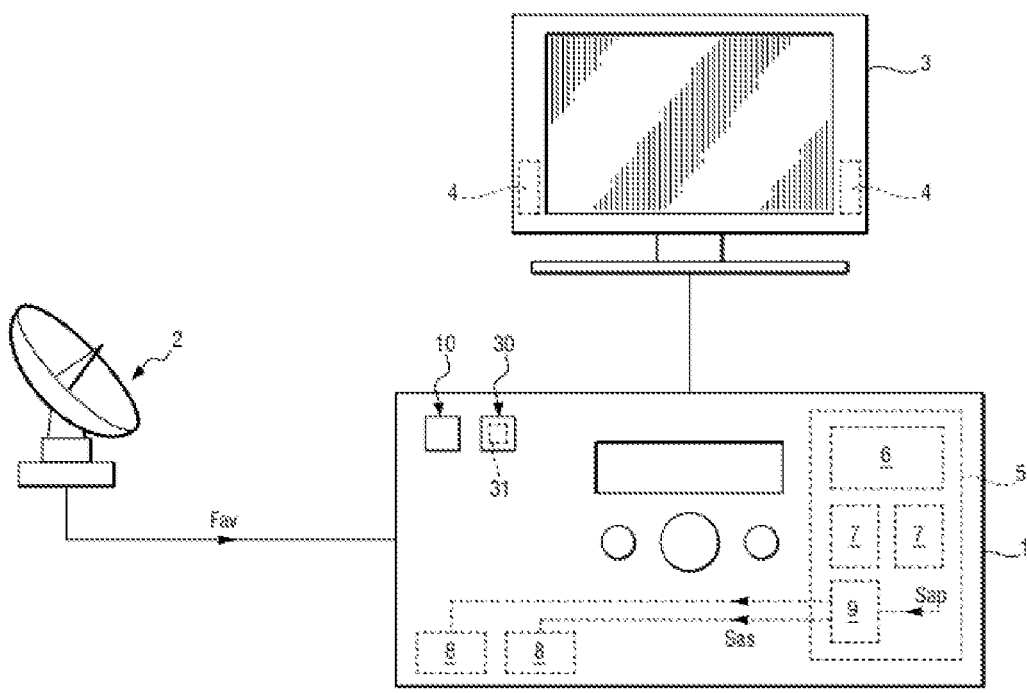
FIG. 1 represents a source of an audio-video stream, a set-top box and a television.

In reference to FIG. 1, the audio playback equipment according to a particular embodiment, is an audio-video set-top box 1, which makes it possible to transmit an audio-video stream Fav, produced by a source 2, to one or more pieces of external equipment, which playback the audio-video stream Fay.

The source 2 is, for example, a broadcast network. The broadcast network can be a satellite television network, an internet connection, a digital terrestrial TV (DTTV) network, a cable television network, etc. The source 2 can also be another piece of equipment connected to the set-top box 1, and for example, a CD, DVD or BlueRay player. The source 2 can also be a storage medium such as a USB stick or a memory card connected to the set-top box 1.

The external equipment comprise, in this case, a television 3 which integrates one or more external loudspeakers 4.

The set-top box 1 first comprises a processing unit 5.

The processing unit 5 comprises one or more processing components 6, and for example, any general or specialist processor or microprocessor (for example, a DSP, for Digital Signal Processor, or a GPU, for Graphics Processing Unit), a microcontroller, or a programmable logic circuit, such as an FPGA (for Field Programmable Gate Array) or an ASIC (for Application-Specific Integrated Circuit).

The processing unit 5 also comprises memories 7. At least one of these memories 7 forms a recording medium which can be read by a computer, on which at least one computer program is recorded, comprising instructions which lead the processing unit 5 to execute at least some of the steps of the audio playback method which will be described. One of these memories 7 can be integrated in one of the processing components 6.

The set-top box 1 comprises, in addition, one or more internal loudspeakers 8, and an audio module 9 which is, in this case, integrated in the processing unit 5, and which is connected to the internal loudspeakers 8. The set-top box 1 also comprises means for connecting to the external loudspeakers 4 of the television 3. In this case, it is noted that the invention can be implemented in a piece of electrical equipment which integrates at least one internal loudspeaker and/or which comprises means for connecting with at least one external loudspeaker.

The set-top box 1 is thus capable of playing back audio signals via its own internal loudspeakers 8, or via the external loudspeakers 4 of the television 3.

The audio module 9, controlled by the processing unit 5, applies processing on a primary audio signal Sap, comprised for example, in the audio-video stream, to produce a secondary audio signal Sas. The secondary audio signal Sas is thus played back via the internal loudspeakers 8 and/or the external loudspeakers 4.

The processing consists, in particular, of applying on the primary audio signal Sap, a particular audio profile from among different audio profiles.

By "audio profile", this means particular values of audio parameters affecting the playback of the sound.

The audio parameters comprise, for example:
equalisation parameters, comprising gains or lists of gains for different frequency bands, and/or
activation parameters of one or more filters, and/or
filtering parameters defining, for each filter, a response from said filter.

The equalisation parameters define an equalisation curve which specifies a gain to be applied according to the frequency, in order to emphasise or dampen the bass, midrange or treble. The equalisation parameters therefore comprise gains of lists of gains for different frequency bands. The frequency bands comprise, for example, a band corresponding to low frequencies (bass sounds, frequencies, for example, of between 20 Hz and 500 Hz), a band corresponding to medium frequencies (frequencies, for example, of between 500 Hz and 5 kHz), and a band corresponding to high frequencies (treble sounds, frequencies, for example, greater than 2 kHz).

The filter(s) comprise(s), for example, a physiological corrective (commonly called "loudness") filter.

The activation parameter of the filter is a Boolean signal, which can take a first Boolean value which activates the filter or a second Boolean value which does not activate the filter.

The filter(s) comprise(s), for example, a compressor filter. Again, the activation parameter is a Boolean signal. The audio parameters can also comprise filtering parameters comprising a triggering threshold and a compression ratio.

The filter(s) comprise(s), for example, a voice intelligibility improvement filter. Again, the activation parameter is a Boolean signal.

The filter(s) comprise(s), for example, a reverberation filter or a background noise damper filter. Again, the activation parameter is a Boolean signal.

Naturally, the audio parameters used can comprise one or more of the parameters which have just been cited.

The possible current values of the audio parameters are stored in one of the memories 7 of the processing unit 5.

In this case, and in a non-limiting manner, the current values of the audio parameters can be selected from among first values of the audio parameters and second values of the audio parameters.

The first values of the audio parameters form a "night" profile and the second values of the audio parameters form a "day" profile.

The "day" profile can, for example, comprise parameter values offering an optimal listening quality with a high sound volume, while the "night" profile can comprise parameter values offering an optimal listening quality with a lower volume.

For example, the night profile is such that the low frequencies are dampened. Indeed, it is known that the bass carries the farthest and is therefore more annoying for neighbours.

Alternatively, the use of the night profile can make it possible to mainly lower the volume while choosing equalisation parameter values, such as bass and treble are less dampened than midrange, which makes it possible to give the listener an impression of a higher volume than it actually is (this effect was, in particular, called "loudness" on old Hi-Fi ranges).

According to another example, the night profile can activate a "compressor" or "limiter" effect, which decreases the volume of the noisy sequences while preserving the volume of calm sequences. Thus, the most noisy sequences (such as explosions in a film) are dampened, but the calm sequences remain audible.

The set-top box 1 in addition integrates at least one internal photosensitive sensor and/or comprises means for connecting with at least one external photosensitive sensor.

The set-top box 1 can therefore comprise at least one internal photosensitive sensor 10. The photosensitive sensor 10 is, for example, a luminosity sensor or a colour temperature sensor.

In the case where the set-top box 1 comprises a camera the photosensitive sensor used can be a sensor integrated in the camera 30—and, for example, the sensor enabling the capture of images by said camera 30.

The set-top box 1 can also comprise several internal photosensitive sensors 10, possibly of a different type.

The set-top box 1 can also be connected to an external photosensitive sensor, located in a piece of equipment which is distinct from the set-top box 1. The set-top box 1 can thus, for example, be connected to a camera integrating a photosensitive sensor. In this case, the set-top box 1 comprises means for connecting to the external photosensitive sensor. In the case of a camera, this is, for example, a USB connector.

Light, in the environment of the set-top box 1, can come from the natural and/or artificial light source.

It is first considered that the photosensitive sensor used in a luminosity sensor.

Figure 2:
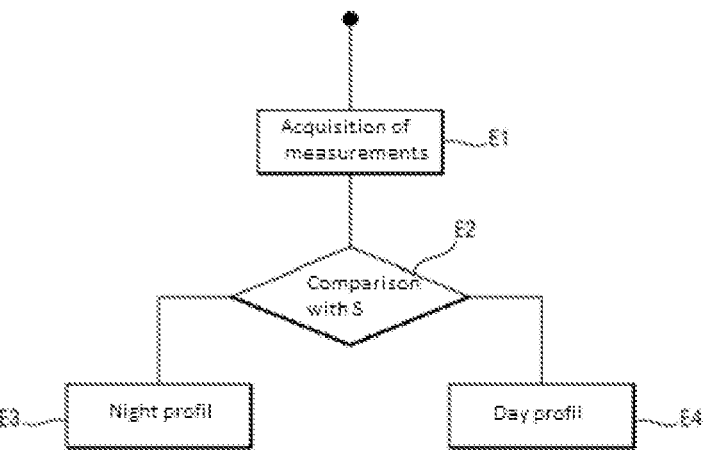
FIG. 2 represents the steps of an audio playback method according to an embodiment.

In reference to FIG. 2, the processing unit 5 acquires or estimates, by using at least one measurement produced by the luminosity sensor, a light parameter representative of the light illuminating the environment of the set-top box 1 (i.e. the light in the room, wherein the set-top box 1 is positioned).

The light parameter is luminosity. The processing unit therefore acquires the measurements produced by the luminosity sensor 10 and therefore estimates the luminosity as being equal to said measurements (the processing unit 5 can optionally process the measurements and, for example, use an average of several measurements): step E1.

The luminosity measurements are taken and acquired continuously or at regular intervals, for example, every 10 s.

The processing unit 5 thus selects, according to the luminosity, current values of the audio parameters. In this case, the current values of the audio parameters are selected from among first values of the audio parameters (defining the night profile) and second values of the audio parameters (defining the day profile).

For that, the processing unit 5 compares the luminosity with at least one predetermined threshold, and selects the first values of the audio parameters or the second values of the audio parameters according to said comparison.

In this case, the processing unit 5 compares the luminosity with a predetermined threshold S, equal for example to 200 lux: step E2.

If the luminosity is less than (in this case, less than or equal to) the predetermined threshold S, which is equal, for example, to 200 lux, the processing unit 5 selects as current values of the audio parameters, the first values of the audio parameters (night profile): step E3.

If the luminosity is greater than (in this case, strictly greater than) the predetermined threshold S, the processing unit 5 selects as current values of the audio parameters, the second values of the audio parameters (day profile): step E4.

The processing unit 5 thus applies, by the audio module 9, the current values of the audio parameters on the primary audio signal Sap to produce a secondary audio signal Sas, and plays back the secondary audio signal Sas via the internal loudspeakers 8 or the external loudspeakers 4.

Alternatively, the luminosity measurement can be taken with hysteresis.

Indeed, the comparison with one single predetermined threshold has the disadvantage that, if the actual luminosity is close to said threshold, then the measured luminosity risks alternating between a value greater than the threshold and a value less than the threshold, which can cause a disagreeable effect when the audio parameters alternate between the "day" profile and the "night" profile.

Figure 3:
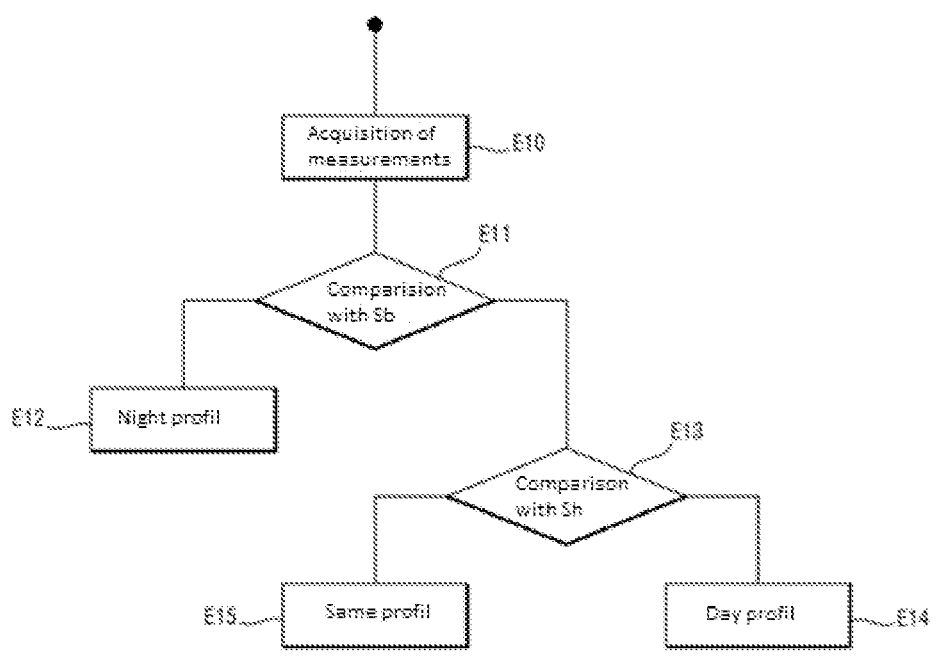
FIG. 3 represents the steps of said method according to another embodiment.

In reference to FIG. 3, the processing unit 5 therefore acquires the measurements produced by the luminosity sensor and therefore estimates the luminosity as being equal to said measurements (the processing unit 5 can optionally process the measurements, for example, use an average of several measurements): step E10.

The luminosity measurements are taken and acquired continuously or at regular intervals, for example, every 10 s.

The processing unit 5 compares the luminosity with a predetermined low threshold Sb: step E11.

If the luminosity is less than (in this case, strictly less than) the predetermined low threshold Sb, which is equal, for example, to 100 lux, the processing unit 5 selects as current values of the audio parameters, the first values of the audio parameters (night profile): step E12.

In step E11, if the luminosity is greater than or equal to the predetermined low threshold Sb, the processing unit 5 compares the luminosity with a predetermined high threshold Sh, which is equal, for example, to 1000 lux: step E13.

If the luminosity is greater than (in this case, strictly greater than) the predetermined high threshold Sh, the processing unit 5 selects as current values of the audio parameters, the second values of the audio parameters (day profile): step E14.

If the luminosity is comprised between the predetermined low threshold Sb and the predetermined high threshold Sh, the processing unit 5 continues to apply on the primary audio signal, the current values of the audio parameters previously selected, i.e. the first values of the audio parameters if these were used, or the second values of the audio parameters if these were used: step E15.

Alternatively, in step E15, if the luminosity is comprised between the predetermined low threshold Sb and the predetermined high threshold Sh, the processing unit 5 combines two sets of parameter values according to a weighting coefficient $\alpha$ of between 0 and 1.

Thus, if the luminosity L is less than (in this case, strictly less than) the predetermined low threshold $L^-$ (for example, equal to 100 lux), the weighting coefficient $\alpha$ is such that:

$$\alpha = 0$$

which returns to selecting as current values of the audio parameters, the first values of the audio parameters (night profile).

If the luminosity L is greater than (in this case, strictly greater than) the predetermined high threshold $L^+$ (for example, equal to 1000 lux), the weighting coefficient $\alpha$ is such that:

$$\alpha = 1$$

which returns to selecting as current values of the audio parameters, the second values of the audio parameters (day profile).

However, if the luminosity L is comprised between the predetermined low threshold and the predetermined high threshold, i.e. if:

$$L^- \leq L \leq L^+$$

the weighting coefficient is such that:

$$\alpha = \frac{L - L^-}{L^+ - L^-}$$

The weighting coefficient is therefore calculated from the predetermined low threshold, from the predetermined high threshold and from the light parameter (in this case, the luminosity).

The processing unit 5 produces the secondary audio signal Sas by using the weighting coefficient $\alpha$, the first values of the audio parameters and the second values of the audio parameters.

Figure 4:
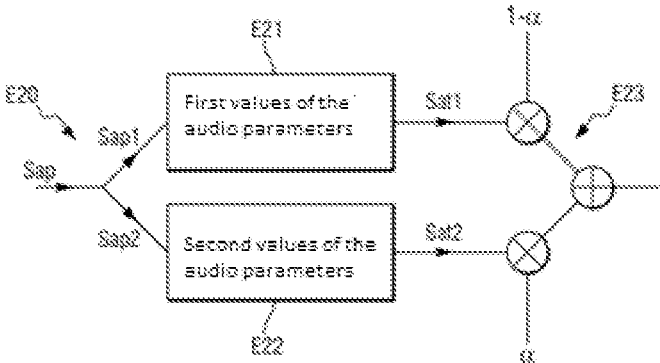
FIG. 4 represents the steps of a method, according to an embodiment, making it possible to produce a secondary audio signal by combining two sets of parameter values.

The secondary audio signal can be produced in this case, according to the method illustrated in FIG. 4.

The input signal, i.e. the primary audio signal, is duplicated: step E20.

Each copy is processed independently with one of the two sets of parameter values.

Thus, the first values of the audio parameters are applied on a first copy Sap1 of the signal to obtain a first processed signal Sat1: step E21. The second values of the audio parameters are applied on a second copy Sap2 of the signal to obtain a second processed signal Sat2: step E22.

Then, the two processed signals Sat1, Sat2 are combined by a weighted average by the weighting coefficient: $\alpha$: So$=(1-\alpha)\times$Sat1$+\alpha\times$Sat2: step E23.

It must be noted that this embodiment can be used, even in the case where the processing actions carried out in step E21 and in step E22 are different processing actions. In particular, this embodiment can be used, even if one of the processing actions carried out in step E21 and in step E22 does not modify the primary audio signal, which makes it possible, for example, to carry out a smooth activation or deactivation of an effect.

This embodiment has the advantage of being totally generic: it can be applied to any pair of processing actions E21, E22. However, this embodiment is relatively expensive in calculations, since it involves processing the primary audio signal twice.

According to another embodiment, for each audio parameter, the first audio parameter value and the second audio parameter value associated with said audio parameter are combined independently. In this way, combined parameter values are obtained, forming an audio profile which is then applied once on the primary audio signal Sap.

As has been seen, the values of the parameters of certain parameters are numerical values. In this case, these parameter values are combined by a weighted average, by using the weighting coefficient $\alpha$, to obtain combined parameter values.

However, certain parameters are filter activation parameters, i.e. Boolean signals which define whether a filter must be applied or not.

Moreover, the filters are themselves generally associated with filtering parameters (which define not the activation or the deactivation of the filter, but the response of the filter).

Therefore, a "set of parameters" are defined, associated with a filter (or with another individual functional module0, as being an assembly comprising an activation parameter and filtering parameters. "Set of parameter values" is referred to, to mean the values that can take the parameters from the set of parameters.

The combined parameter values are defined as follows.

For the activation parameter, if the two parameter values (values of the Boolean signal) have the same value, then the combined parameter value is equal to this same value.

However, if the two parameter values have different values, this means that one of the parameter values is the "true" value (activation of the filter), and that the other of the parameter values is the "false" value (inactive filter).

In this case, the combined parameter value takes the "true" value.

Therefore, two sets of parameter values are associated with the set of parameters: a "set of active values" which comprises the "true" parameter value for the activation parameter, and a "set of inactive values" which comprises the "false" parameter value for the activation parameter.

According to a first embodiment, the parameter values of the filtering parameters are combined (by using the weighting coefficient $\alpha$) as if the set of inactive values comprised minimum parameter values for the filtering parameters.

For example, if the activation parameter (Boolean signal) controls the activation of a reverberation filter, the combined parameter value for the level parameter is calculated as if the set of inactive values comprised a value of −60 dB for this parameter, and the combined parameter value for the duration parameter is calculated as if the set of inactive values comprised a zero value for this parameter.

Alternatively, the filter controlled by said activation parameter (Boolean signal) comprises a filtering parameter affecting the significance of its effect. In this case, the combined parameter value for said parameter is calculated as if the set of inactive values comprised a minimum value for the parameter affecting the significance of the effect, and the combined parameter values for the other parameters of said filter take a value equal to the value of the set of active values.

For example, if the activation parameter (Boolean signal) controls the activation of a reverberation filter, the combined parameter value for the level parameter is calculated as if the set of inactive values comprised a value of −60 dB for this parameter, and the combined parameter value for the duration parameter is equal to the value of the duration parameter in the set of active values.

Figure 5:
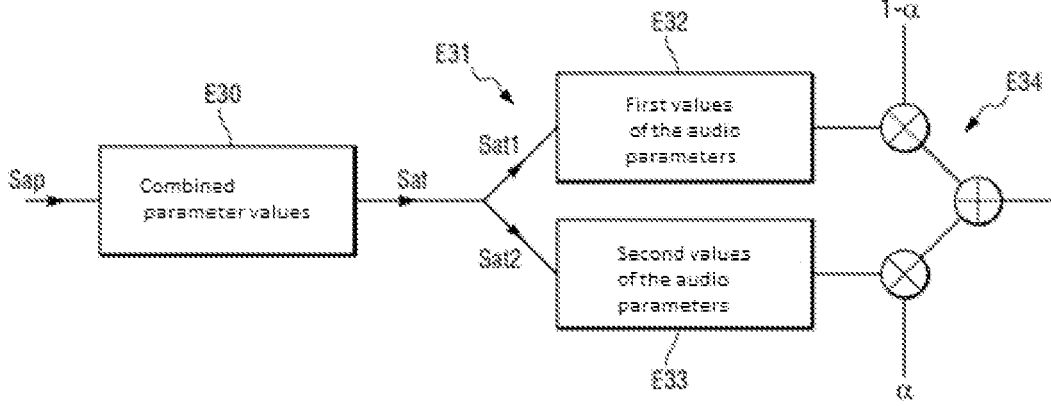
FIG. 5 represents the steps of said method, according to another embodiment.

According to a third embodiment, called hybrid mode, certain parameter values are combined independently, in order to obtain a partial set of combined values could be applied only once, and other parameter values are combined by independent processing actions. For example, in reference to FIG. 5, the equalisation parameter values can be combined to be applied on the primary audio signal Sap only once: step E30. Then, the processed audio signal Sat is duplicated to form a first copy Sat1 and a second copy Sat2: step E31.

The first values of audio parameters and the second values of audio parameters are thus applied independently (steps E32, E33) and combined retrospectively: step E34.

It has been indicated above that the light parameter used is luminosity.

However, the light parameter used can be different. The photosensitive sensor 10 used can be a colour temperature sensor, and the light parameter used can thus be the colour temperature of the light illuminating the environment of the set-top box 1.

It is known that artificial lighting generally has a colour temperature of between 1800K and 6000K, while natural lighting generally has a colour temperature of between 5500K and 8000K.

Consequently, the current values of the audio parameters can be selected as has been presented above, but by using the measured colour temperature instead of luminosity.

Thus, if the measured colour temperature is less than (in this case, less than or equal to) a predetermined threshold, equal for example, to 5750K, the processing unit 5 selects as current values of the audio parameters, the first values of the audio parameters (night profile).

If the colour temperature is greater than (in this case, strictly greater than) the predetermined threshold, the processing unit 5 selects as current values of the audio parameters, the second values of the audio parameters (day profile).

The processing unit 5 thus applies by the audio module 9, the current values of the audio parameters on the primary audio signal to produce a secondary audio signal, and plays back the secondary audio signal via the internal loudspeakers 8 or the external loudspeakers 4.

Alternatively, the colour measurement temperature can be taken with hysteresis.

The processing unit 5 compares the colour temperature with a predetermined low threshold and with a predetermined high threshold.

If the colour temperature is less than (in this case, strictly less than) the predetermined low threshold, equal, for example, to 5500K, the processing unit 5 selects as current values of the audio parameters, the first values of the audio parameters (night profile).

If the colour temperature is greater than (in this case, strictly greater than) the predetermined high threshold, equal, for example, to 6000K, the processing unit 5 selects as current values of the audio parameters, the second values of the audio parameters (day profile).

If the colour temperature is comprised between the predetermined low threshold and the predetermined high threshold, the processing unit 5 continues to apply on the primary audio signal, the current values of the audio parameters previously selected, i.e. the first values of the audio parameters if these were used, or the second values of the audio parameters, if these were used.

Alternatively, if the colour temperature is comprised between the predetermined low threshold and the predetermined high threshold, the processing unit 5 combines two sets of parameters according to a weighting coefficient α of between 0 and 1, as has been described above.

The predetermined low threshold $T^-$ is, for example, equal to 5000K, and the predetermined high threshold $T^+$ is, for example, equal to 6000K.

According to a particular embodiment, the processing unit 5 acquires or estimates, by using measurements produced by one or more photosensitive sensors 10, a first light parameter and a second light parameter, in this case, the luminosity and the colour temperature. The processing unit 5 can use the measurements produced by a luminosity sensor and by a colour temperature sensor, if the set-top box 1 is equipped with these two sensors. The processing unit 5 can also estimate the parameters from the measurements produced by one single sensor.

The processing unit 5 thus compares the luminosity with a first predetermined threshold (for example, equal to 200 lux), and the colour temperature with a second predetermined threshold (for example, equal to 5750K).

If the luminosity and the colour temperature are less than (in this case, less than or equal to) respectively the first predetermined threshold and the second predetermined threshold, the processing unit 5 selects and applies on the primary audio signal, the first values of the audio parameters (night profile).

If the luminosity and the colour temperature are greater than (in this case, strictly greater than) respectively the first predetermined threshold and the second predetermined threshold, the processing unit 5 selects and applies on the primary audio signal, the second values of the audio parameters (day profile).

Otherwise, the processing unit 5 continues to apply on the primary audio signal, the current values of the audio parameters previously selected.

Figure 6:
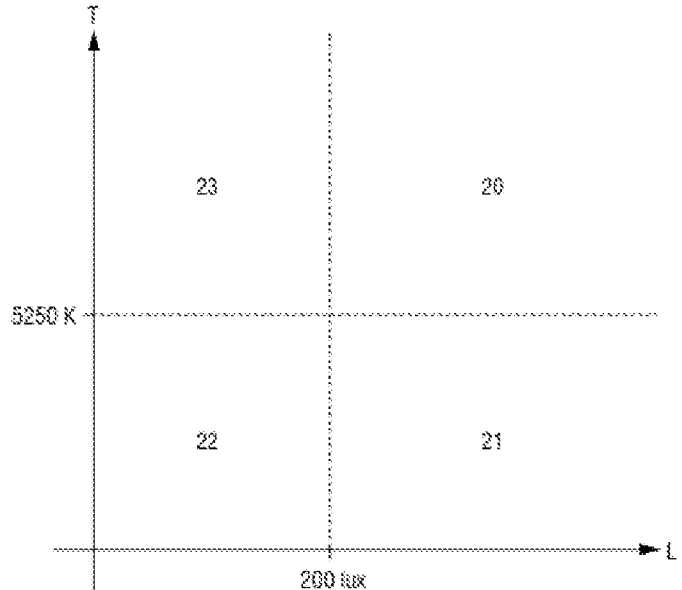
FIG. 6 is a graph defining, according to the colour temperature and the luminosity, zones wherein different audio profiles are used.

The different possible combinations of measured luminosity and of measured colour temperature are seen in FIG. 6. The x-axis represents the measured luminosity, the y-axis represents the measured colour temperature. The two predetermined threshold cut the graph into four sectors 20, 21, 22 and 23. When the measured luminosity/measured colour temperature combination is in the sector 20, the processing unit 5 applies the parameters of the "day" profile. When the combination is in the sector 22, the processing unit 5 applies the parameters of the "night" profile. When the combination is in the sector 21 or 23, the processing unit 5 preserves the current parameters.

In a variant, according to an alternative embodiment, when the combination is in the sector 21 or 23, the processing unit 5 applies a predefined set of parameters chosen according to the sector. Optionally, this set of parameters has been defined by the user through a configuration interface.

In an embodiment, the set-top box 1 does not comprise a luminosity sensor, but however comprises a camera 30. The photosensitive sensor used is integrated in the camera 30. In this case, the processing unit 5 does not necessarily have access directly to the measurements of the luminosity.

An automatic exposure module 31 is, in this case, integrated in the camera 30.

The processing unit 5 can use the automatic exposure module 31 to estimate the luminosity.

When the camera 30 captures an image, the automatic exposure module 31 indeed chooses the exposure parameters (opening, application time and sensitivity) so as to optimise the yield of the captured image.

This choice does not necessarily require an explicit step of measuring luminosity.

However, the exposure parameters are linked to ambient luminosity by the following formula:

$$\frac{N^2}{t} = \frac{L \times S}{K}$$

where:
  N is the opening of the diaphragm,
  t is the application time,
  L is the luminance of the scene,
  S is the sensitivity of the sensor,
  K is a constant (generally K=12.5 cd/m$^2$).

The processing unit 5 estimates the luminosity from exposure parameters selected by the automatic exposure module 31, by using the formula:

$$L = \frac{K \times N^2}{S \times t}$$

It is noted that numerous webcams on the market have an fixed opening and sensitivity and adjust the exposure by only modifying the application time. Advantageously, in this case, the processing unit 5 can directly compare the application time to one or more of the fixed thresholds, rather than explicitly carrying out the conversion and comparing the luminosity.

It is also noted that, in this case, the direction of the comparisons is inverted: for example, for the method, by simple luminosity measurement, the processing unit 5 will apply the "night" profile (first values of the audio parameters) if the application time is greater than the threshold (which corresponds to a luminosity less than the threshold) and will apply the "day" profile (second values of the audio parameters) if the application time is less than the threshold (which corresponds to a luminosity greater than the threshold).

It is also noted that the automatic exposure module 31 can be integrated in the camera 30 itself or be a module of the set-top box 1, connected to the camera 30, which controls the exposure parameters of the camera 30 to optimise the yield of the image. Likewise, if the camera is connected to the set-top box 1 (and not integrated in it), the automatic exposure module can be integrated in the camera or connected to it.

Likewise, concerning the colour temperature, the photosensitive sensor 10 of the set-top box 1 is not necessarily a sensor dedicated to the measurement of this light parameter.

Again, the photosensitive sensor 10 used can be integrated in the camera 30, and the processing unit 5 does not thus necessarily have access directly to measurements of the colour temperature.

The automatic exposure modules of certain cameras measure the colour temperature at the same time as the illumination and can therefore be used to obtain the colour temperature of the ambient lighting, but numerous cameras have a fixed colorimetry adjustment.

The camera 30 can therefore not have an automatic exposure module 31 capable of measuring the colour temperature. In this case, the processing unit 5 acquires an image produced by the camera and estimates the colour temperature from said image.

In this case, the processing unit 5 obtains a measurement of the colour temperature by following the following steps.

The processing unit 5 acquires an image produced by the camera 30 in RGB (Red Green Blue) format.

The processing unit 5 calculates the average colour of the pixels of the image.

The processing unit 5 thus estimates the colour temperature from the average colour of the pixels of the image, for example, by using "colour-temperature) open source software.

The processing unit 5 calculates the ratio $\rho=\bar{b}/\bar{r}$ between the average of the blue components of the pixels of the image and the average of the red components of the pixels of the image.

The processing unit 5 thus searches for, by dichotomy, the colour temperature which corresponds to a colour having the same ratio between its red component and its blue component.

Advantageously, the processing unit 5 can directly compare the ratio $\rho$ with one or more fixed thresholds, rather than explicitly carrying out the conversion and compare the colour temperatures in Kelvin.

It is noted that there are other methods for estimating the colour temperature from an image (see, for example, the document, "*Estimating the Illuminant Color from the Shading of a Smooth Surface*", Hsien-Che Lee, MIT A.I. Memo No. 1068 (1988)).

It can be relevant to carry out a calibration phase, in operation, on the photosensitive sensor 10. In particular, when the photosensitive sensor 10 used is integrated in a camera 30, the luminosity or colour temperature measurement can be highly affected by the scene seen by the camera.

For example, the presence of curtains or blue-painted paper can give a measured colour temperature which is hotter than if the curtains or the painted paper was red under the same lighting conditions. It can therefore be interesting to provide, during a calibration phase, to automatically adjust the predetermined thresholds under the conditions of use of the set-top box 1.

To this end, the processing unit 5 calculates a sliding average over several days of the measured luminosities and measured colour temperatures and adjust the predetermined thresholds according to said average.

For example, the processing unit 5 calculates a predetermined threshold equal to the average multiplied by a fixed coefficient (equal, for example, to 0.75). This operating mode is particularly suitable for luminosity.

For example, the processing unit 5 calculates a predetermined threshold equal to the average to which a predetermined constant is added (or subtracted).

The processing unit 5 can further calculate a sliding standard deviation over several days, and the predetermined threshold is thus equal to the average to which the standard deviation multiplied by a predetermined constant is added (or subtracted). Therefore:

$$\tau=\mu+k\times\sigma$$

where $\tau$ is the predetermined threshold, $\mu$ is the average, $\sigma$ is the standard deviation, and k is the predetermined constant (for example, k=−1.5).

It is noted that the colour temperature measurement is not reliable, if the luminosity is too low. Advantageously, the calculation of the average and of the standard deviation of the colour temperature ignores the measurements for which the luminosity is less than a fixed threshold (for example, lux).

It is known that it is very difficult, even impossible, to measure a colour temperature reliably, when the luminosity is very low. According to a particular embodiment, and in the case where the set-top box 1 comprises one or more photosensitive sensors 10 capable of producing luminosity and colour temperature measurements or estimations, the processing unit 5 compares the ambient luminosity with a predetermined very low threshold (for example, equal to 10 lux) and applies the "night" mode if the ambient luminosity is less than said low threshold. If the measured luminosity is greater than said low threshold, then the processing unit choose the profile by considering at least the colour temperature.

Advantageously, when new current values of the audio parameters have been selected to replace previous current values of the audio parameters, the processing unit 5 applies a smooth transition in order to avoid audible artifacts in the sound signal broadcast by the set-top box 1 (via the loudspeakers 8 and 4).

For that, the processing unit 5 initialises a combination coefficient $\beta$ at the start of a transition period of a predetermined duration, then progressively varies the combination coefficient $\beta$ for the predetermined duration of the transition period.

At the start of the transition period, therefore:
$\beta=0$
At the end of the transition period, therefore:
$\beta=1$
During the transition period, the processing unit 5 produces the secondary audio signal by using the combination coefficient $\beta$, the previous current values of the audio parameters and the new current values of the audio parameters. The processing unit 5 applies the current values of the audio parameters equal to combinations between the previous current values of the audio parameters and the new current values of the audio parameters. The method described above for utilising the weighting parameter can be reused with the combination parameter.

The processing unit 5 can, when new current values of the audio parameters have been selected to replace previous current values of the audio parameters, expect the occurrence of a period of silence in the primary audio signal, and make the replacement during said period of silence. That again makes it possible to avoid audible artifacts in the sound signal broadcast by the set-top box 1 (via the loudspeakers 8 and 4).

To detect a period of silence, the processing unit 5 calculates, for example, an average energy of the primary (or secondary) audio signal and considers that there is a silence if this energy is less than a predetermined threshold (for example, −40 dBFs) for a sufficiently long predetermined duration (for example, 500 ms). Alternatively, the processing unit 5 considers that there is a silence if the peak value of the primary audio signal is less than the threshold for a sufficiently long predetermined duration (possibly equal to the predetermined duration above).

The processing unit 5 can also, when new current values of the audio parameters have been selected to replace previous current values of the audio parameters, expect the reception of a change order coming from a user and aiming to apply a change on the primary audio signal. The processing unit 5 then makes the replacement at the same time as the change is made.

The change order is, for example, a ("zapping") source change order, or a pause or restart in playing.

According to a particular embodiment, the set-top box 1 receives metadata in the audio-video stream Fav, which identify the programme being broadcast (for example, EITs, for "Event Information Tables" of the DVB standard). The programme being broadcast includes the primary audio signal being played back.

The processing unit 5 acquires these metadata.

When new current values of the audio parameters have been selected to replace previous current values of the audio parameters, the processing unit 5 expects that the metadata indicate a change of programme being broadcast (and therefore of the primary audio signal), then makes the replacement at the same time as the change is made.

Naturally, the invention is not limited to the embodiments described, but includes any variant entering into the field of the invention, such as defined by the claims.

In this case, the possible use of two "day" and "night" profiles has been described, and two functioning ranges defined by predetermined thresholds and corresponding to the two profiles.

The invention can also be applied to a greater number of profiles with corresponding functioning ranges, for example, there could be three "day", "night" and "intermediate" profiles, with three functioning ranges corresponding to a very low luminosity, an average luminosity and a high luminosity.

The electrical equipment, wherein the invention is implemented, is not necessarily a set-top box, but can be any electrical equipment capable of playing back audio signals: smart speaker, computer, smartphone, games console, etc.

The invention claimed is:

1. Audio playback equipment, comprising:
at least one internal loudspeaker, and/or means for connecting with at least one external loudspeaker;
at least one internal photosensitive sensor which is integrated in a camera integrated in the audio playback equipment, and/or means for connecting with at least one external photosensitive sensor, which is integrated in a camera connected to the audio playback equipment;
a processing unit arranged to:
acquire or estimate, by using at least one measurement produced by the internal photosensitive sensor and/or the external photosensitive sensor, at least one light parameter representative of a light illuminating an environment of the audio playback equipment, the at least one light parameter comprising at least one parameter from a luminosity and a color temperature, the at least one measurement produced by the internal photosensitive sensor and/or the external photosensitive sensor being taken and acquired continuously or at regular intervals;
select, according to the light parameter, current values of audio parameters;
apply the current values of the audio parameters on a primary audio signal (Sap) to produce a secondary audio signal (Sas);
playback the secondary audio signal via the internal loudspeaker and/or the external loudspeaker.

2. The audio playback equipment according to claim 1, wherein the current values of the audio parameters are selected from among first values of the audio parameters and second values of the audio parameters, the processing unit being arranged to compare the light parameter with at least one predetermined threshold, and to select the first values of the audio parameters or the second values of the audio parameters according to said comparison.

3. The audio playback equipment according to claim 2, the processing unit being arranged to
compare the light parameter with a predetermined low threshold and with a predetermined high threshold;
if said light parameter is less than the predetermined low threshold, select and apply on the primary audio signal, the first values of the audio parameters;
if said light parameter is greater than the predetermined high threshold, select and apply on the primary audio signal, the second values of the audio parameters.

4. The audio playback equipment according to claim 3, wherein the processing unit is arranged to, if said light parameter is comprised between the predetermined low threshold and the predetermined high threshold, continue to apply on the primary audio signal, the current values of the audio parameters previously selected.

5. The audio playback equipment according to claim 3, wherein the processing unit is arranged to, if said light parameter is comprised between the predetermined low threshold and the predetermined high threshold, produce the secondary audio signal by using a weighting coefficient, the first values of the audio parameters and the second values of the audio parameters, the weighting coefficient being calculated from the predetermined low threshold, from the predetermined high threshold and from said light parameter.

6. The audio playback equipment according to claim 1, wherein the processing unit is arranged to acquire or estimate a first light parameter, said first light parameter being the luminosity, and a second light parameter said second light parameter being the color temperature, the current values of the audio parameters being selected from among the first values of the audio parameters and the second values of the audio parameters,
the processing unit being further arranged to:
compare the first light parameter with a first predetermined threshold, and the second light parameter with a second predetermined threshold;
if the first light parameter and the second light parameter are respectively less than the first predetermined threshold and than the second determined threshold, select and apply on the primary audio signal, the first values of the audio parameters;
if the first light parameter and the second light parameter are respectively greater than the first predetermined threshold and than the second predetermined threshold, select and apply on the primary audio signal, the second values of the audio parameters.

7. The audio playback equipment according to claim 1, an automatic exposure module being integrated in or connected to said camera, the at least one light parameter comprising a luminosity, the processing unit being arranged to estimate the luminosity from exposure parameters selected by the automatic exposure module.

8. The audio playback equipment according to claim 1, the at least one light parameter comprising a color temperature, the processing unit being arranged to:

acquire an image produced by the camera;

estimate the color temperature from said image.

9. The audio playback equipment according to claim 8, comprising the step of calculating an average color of pixels of the image, and of estimating the color temperature from the average color.

10. The audio playback equipment according to claim 1, wherein the processing unit is arranged to, when new current values of the audio parameters have been selected to replace previous current values of the audio parameters:

initialize a combination coefficient at the start of a transition period of predetermined duration, and progressively vary the combination coefficient during the transition period;

during the transition period, produce the secondary audio signal (Sas) by using the combination coefficient, the previous current values of the audio parameters and the new current values of the audio parameters;

following the transition period, produce the secondary audio signal (Sas) by using the new current values of the audio parameters.

11. The audio playback equipment according to claim 1, wherein the processing unit is arranged to, when new current values of the audio parameters have been selected to replace previous current values of the audio parameters, expect the occurrence of a period of silence in the primary audio signal, and make the replacement during said period of silence.

12. The audio playback equipment according to claim 1, wherein the processing unit is arranged to, when new current values of the audio parameters have been selected to replace previous current values of the audio parameters, expect a reception of a change order coming from a user and aiming to apply a change on the primary audio signal, then make the replacement at the same time as the change is made.

13. The audio playback equipment according to claim 1, wherein the processing unit is arranged to receive metadata identifying a program being broadcast including the primary audio signal, and, when new current values of the audio parameters have been selected to replace previous current values of the audio parameters, expect that the metadata indicate a change of the program being broadcast, then make the replacement at the same time as the change is made.

14. The audio playback equipment according to claim 1, wherein the audio parameters comprise:

equalization parameters, comprising gains or lists of gains for different frequency bands, and/or activation parameters of one or more filters, and/or filtering parameters defining, for each filter, a response from said filter.

15. The audio playback equipment according to claim 14, wherein the filter(s) comprise(s) a physiological corrective filter and/or a compressor filter and/or a voice intelligibility improvement filter and/or a reverberation filter and/or a background noise damper filter.

16. The audio playback equipment according to claim 1, the audio playback equipment being a set-top box.

17. An audio playback method, implemented in the processing unit of a piece of audio playback equipment according to claim 1, and comprising the steps of:

acquire or estimate, by using at least one measurement produced by the internal photosensitive sensor and/or the external photosensitive sensor, at least one light parameter representative of a light illuminating an environment of the audio playback equipment, said at least one light parameter comprising at least one parameter from a luminosity and a color temperature;

select, according to the light parameter, current values of audio parameters;

apply the current values of audio parameters on a primary audio signal (Sap) to produce a secondary audio signal (Sas);

playback the secondary audio signal via the internal loudspeaker and/or the external loudspeaker.

18. A non-transitory computer-readable recording medium, on which a program is recorded, the program comprising instructions for the processing unit of the audio playback equipment to execute the steps of the audio playback method according to claim 17.

* * * * *